(12) United States Patent
Gustafson

(10) Patent No.: US 8,650,877 B1
(45) Date of Patent: Feb. 18, 2014

(54) SOLAR PANELS THAT GENERATE ELECTRICITY AND EXTRACT HEAT: SYSTEM AND METHOD

(71) Applicant: Gary R. Gustafson, Minneapolis, MN (US)

(72) Inventor: Gary R. Gustafson, Minneapolis, MN (US)

( * ) Notice: Subject to any disclaimer, the term of this patent is extended or adjusted under 35 U.S.C. 154(b) by 0 days.

(21) Appl. No.: 13/792,296

(22) Filed: Mar. 11, 2013

(51) Int. Cl.
*B60K 16/00* (2006.01)
*B60L 8/00* (2006.01)
*F03G 6/00* (2006.01)
*F03G 7/00* (2006.01)
*F24J 2/04* (2006.01)
*F24J 2/00* (2006.01)

(52) U.S. Cl.
USPC ........ 60/641.8; 60/641.13; 126/634; 126/702

(58) Field of Classification Search
USPC ................ 60/641.8–641.15; 126/600–608, 126/634–677, 701–703
See application file for complete search history.

(56) References Cited

U.S. PATENT DOCUMENTS

| | | | |
|---|---|---|---|
| 1,329,559 A * | 2/1920 | Tesla ................................ | 138/37 |
| 3,048,375 A * | 8/1962 | Walker ............................. | 165/49 |
| 3,067,572 A | 12/1962 | Baumgartner | |
| 3,998,056 A | 12/1976 | Clark | |
| 4,002,159 A * | 1/1977 | Angilletta ...................... | 126/600 |
| 4,143,640 A | 3/1979 | Pierce | |
| 4,212,289 A | 7/1980 | Hebert | |
| 4,220,137 A | 9/1980 | Tesch et al. | |
| 4,229,660 A | 10/1980 | Adler | |
| 4,284,063 A * | 8/1981 | Watson ......................... | 126/582 |
| 4,304,218 A | 12/1981 | Karlsson | |
| 4,527,548 A * | 7/1985 | Gustafson ...................... | 126/607 |
| 4,848,087 A | 7/1989 | Parker et al. | |
| 5,373,838 A * | 12/1994 | Ho ................................ | 126/569 |
| 5,632,147 A | 5/1997 | Greer | |
| 6,434,942 B1 * | 8/2002 | Charlton ..................... | 60/641.11 |
| 8,127,545 B2 | 3/2012 | Arkas et al. | |
| 2008/0210293 A1 * | 9/2008 | Reid et al. ...................... | 136/251 |
| 2008/0308090 A1 | 12/2008 | Clive | |
| 2009/0260359 A1 | 10/2009 | Palkes | |
| 2010/0229852 A1 | 9/2010 | Buckley | |
| 2011/0088396 A1 | 4/2011 | Katz et al. | |
| 2011/0126824 A1 | 6/2011 | Conlon et al. | |
| 2011/0247329 A1 | 10/2011 | Goto et al. | |
| 2012/0111006 A1 | 5/2012 | Varga | |
| 2012/0222421 A1 | 9/2012 | Hanna | |

* cited by examiner

*Primary Examiner* — Christopher Jetton
(74) *Attorney, Agent, or Firm* — Beck & Tysver, PLLC

(57) ABSTRACT

The present invention is a solar panel that generates electricity and extracts heat. A set of such panels may be assembled into a blind. The blind may have a frame that can be retrofit on an existing window. Fluid in the panel is heated by incoming solar radiation, causing it to move, constrained by a one-way valve, in one direction. A Tesla Valve may be used as the one-way valve. The moving fluid may pass through a generator, generating electricity. Heat may be extracted from the fluid by a heat exchanger. The heat may be used to heat a building.

24 Claims, 10 Drawing Sheets

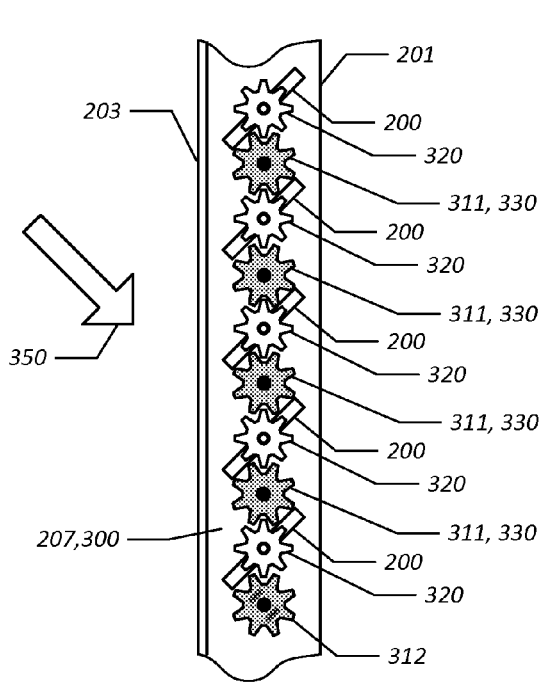
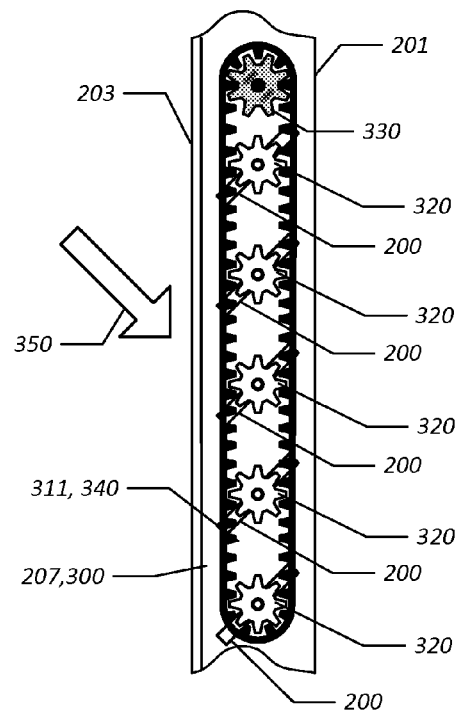
FIG. 3a
FIG. 3b
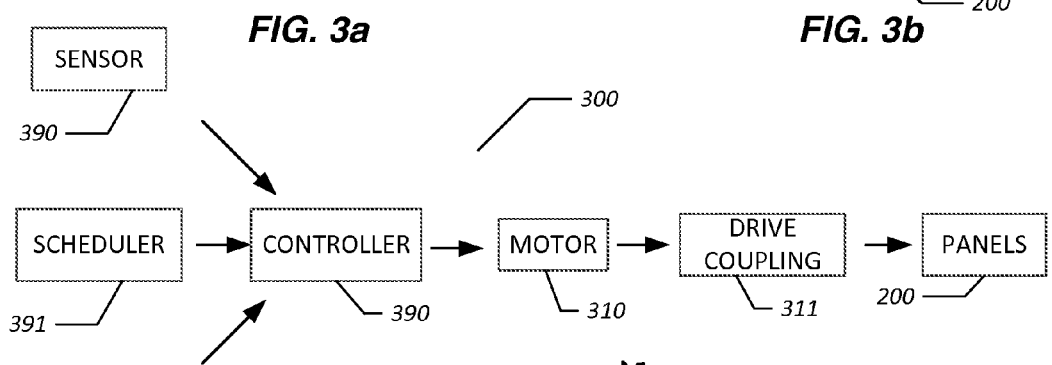
FIG. 3c
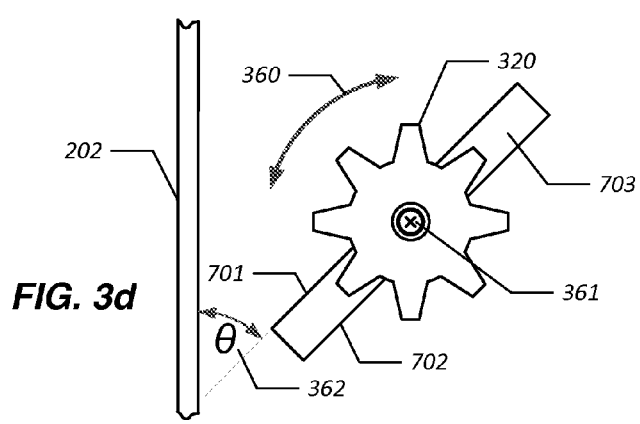
FIG. 3d

SOLAR PANELS THAT GENERATE ELECTRICITY AND EXTRACT HEAT: SYSTEM AND METHOD

FIELD OF THE INVENTION

The present invention relates to solar panels. More specifically, it relates to panels that generate electricity and extract heat.

BACKGROUND OF THE INVENTION

Nikola Tesla invented a one-way valve, now known as the "Tesla Valve," which he patented in 1920 as U.S. Pat. No. 1,329,559, which is hereby incorporated by reference in its entirety. The Tesla Valve has no moving parts. Our FIG. 1 is a copy of FIG. 1 from Tesla's patent, showing a cross section of the channel through which fluid (by which term we mean a gas, liquid, or gas/liquid mix) flows. The description of Tesla's reference numbers will not be repeated here. Baffles and circuitous pathways inhibit flow to the right, while in the direction of the arrow 101, fluid can move relatively freely.

The Tesla Valve is, in effect, a fluid flow diode. A number of variations of the Tesla Valve have been created, that all apply the same fluid flow principle. When we use the term "Tesla Valve", we will mean the original Tesla valve or any one of these or similar variations.

SUMMARY OF THE INVENTION

The present invention is a solar panel that generates electricity and extracts heat. A set of such panels may be assembled into a blind. The blind may have a frame that can be retrofit on an existing window. The system includes a fluid transport system, which may be any combination of pipe, flexible tubing, connectors, and valves. We will refer to this fluid transport system as a tubing system in this document, without loss of generality. In particular, "tubing" does not necessarily imply flexible tubing. Fluid in a cavity or channel within the body of the panel is heated by incoming solar radiation, causing the fluid to move, constrained by a one-way valve, in one direction. A Tesla Valve may be used as a one-way valve. Moving fluid may pass through a generator, generating electricity. Heat may be extracted from the fluid by a heat exchanger. The heat may be used to heat a building. The system may also be used for cooling, by removal of heat from a room where the system is installed.

A panel may include interacting subsystems that adjust the angle of the panels or slats; provide for fluid movement; generate energy; and extract heat. A controller may use information from these systems and from other resources to control and improve operation of the system.

The panels may be fabricated in many ways and from many materials. For example, a panel might be extruded from aluminum, and then be machined to form inflow and outflow tubes that connect to a cavity or tube within the panel.

BRIEF DESCRIPTION OF THE DRAWINGS

FIG. 3a is a cross-sectional side-view through a window and an EG/HE frame, illustrating a gear-driven system for opening and closing a set of panels in a window blind to adjust to incoming solar radiation.

FIG. 3b is a cross-sectional side-view through a window and an EG/HE frame, illustrating a belt-driven system for opening and closing a set of blinds to adjust to incoming solar radiation.

FIG. 3c is a schematic diagram illustrating a Slat-Angle Subsystem.

FIG. 3d is a schematic diagram illustrating possible control-flow paths for changing the angle of a window blind.

DETAILED DESCRIPTION OF EXEMPLARY EMBODIMENTS

This description provides embodiments of the invention intended as exemplary applications. The reader of ordinary skill in the art will realize that the invention has broader scope than the particular examples described here. It should be noted from the outset that the drawings, and the elements depicted by the drawings, are not to scale.

Figure 1:
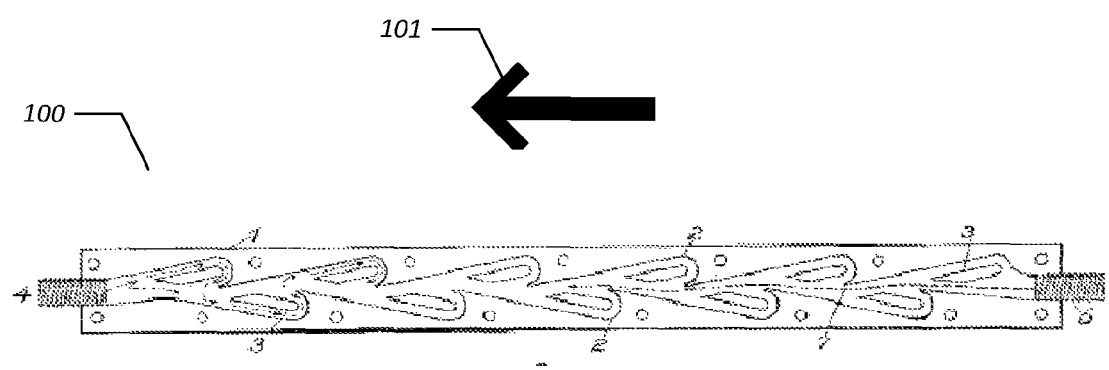
FIG. 1 is a copy of FIG. 1 from Nikola Tesla's Patent (U.S. Pat. No. 1,329,559), showing the channel for flow through a Tesla Valve.
Figure 2A:
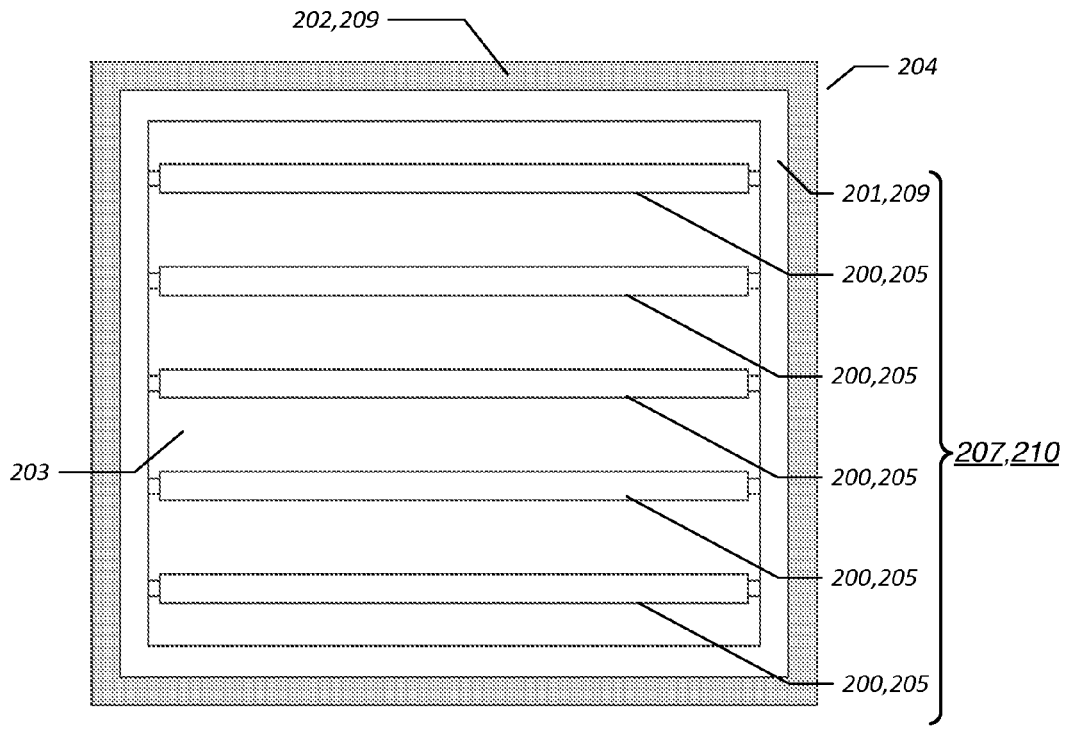
FIG. 2a is a front view illustrating an EG/HE system frame, retrofit to an existing window frame, with the window blind open.
Figure 2B:
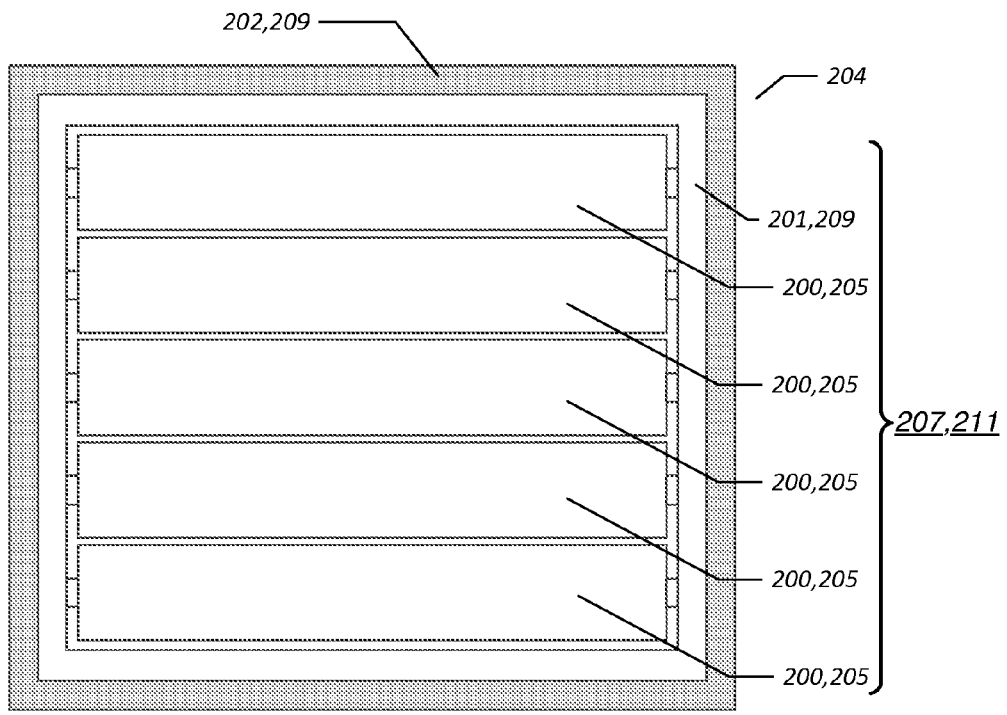
FIG. 2b is a front view illustrating an EG/HE system frame, retrofit to an existing window frame, with the window blind closed.

FIGS. 2a and 2b show a window 204 with a window blind 207 installed, viewed from inside a building. Throughout this disclosure, the directions left, right, up, and down will be relative to this perspective.

In FIG. 2a, the slats 200 are in an open configuration 210, perpendicular, or generally perpendicular, to the windowpane 203. In FIG. 2b, the slats 200 are in a closed configuration 211, parallel, or generally parallel, to the windowpane 203. The angle of the slats 200 relative to the pane 203 can be changed between open and closed, through a range of intermediate configurations 312, such as the one shown in FIG. 3a.

In FIGS. 2a and 2b, the slats 200 are solar panels 200, illustrative of a system 400 that uses incoming solar radiation, or "insolation" 350 to extract heat and generate electricity. We will refer to such a system as a heat extraction/electricity generation (HE/EG) system 400. Although our examples will take a window blind 207 as illustrative, it must be noted that a HE/EG system 400 might be configured using a single panel 200 or set of panels 200, whether or not configured as a window blind 207.

A HE/EG system 400, configured as a window blind 207, may include a system frame 201 into which panels 200 are mounted. A system frame 201 may be the primary or only frame for a window, for example, if the system 400 is being installed in a new building. However, a system frame 201 may be retrofit to a legacy frame 202; that is, a frame and window 204 that were installed in the building prior to installation of the system frame 201. FIGS. 2a and 2b, for example, show a system frame 201 installed inside a legacy frame 202 with existing windowpane 203. Integration of a retrofit HE/EG system 400 with a legacy frame 202 might use any means known in the art.

The American Heritage Dictionary (4th Edition) defines a "venetian blind" as "a window blind consisting of a number of thin horizontal adjustable slats that overlap when closed." Successive panels 200 of an HE/EG system 400 might overlap each other, making the system 400 satisfy the venetian blind definition; or, as in FIG. 2b, they might not. We will therefore use the more general term, "window blind" for such an assembly. Note, also, that while our examples show successive panels 200 arranged vertically, concepts described herein would also apply if the panels 200 are deployed horizontally, or, in general, at any angle.

As illustrated by FIGS. 7a, 7b, 8a, and 8b, a panel 200 in a window blind 207 may have a outer, or exterior-facing side 701; an inner, or interior-facing side 702; a left end 703, and a right end 704. The "sides" of a panel 200 may be flat, essentially flat, or more complex; for example, a side might be contoured, or include a plurality of flat surfaces. An end of a panel 200 may have include or be attached to a variety of structures; for example, one or more tubes, gears, connectors, gaskets, or controlling structures.

FIGS. 3a and 3b are illustrative cross sections through the right-side section of a system frame 201, viewed from the left. These figures show a slat-angle subsystem 300 of the system 400 that might be used to change the angle of the panels 200. The angle might be changed, for example, to increase visibility through the window 204 to/from the outside; to brighten or darken a room; to retain heat in the room; or to optimize solar energy flux through the surfaces of the panels 200. Assuming that the sun is shining on the window 204, flux is maximized by making the exterior-facing side 701 as close as possible to being perpendicular to the sun's rays.

A windowpane 203 may consist of a single layer, such as single-pane glass, or it may consist of multiple layers or panes. A layer or pane may have sublayers. A pane may be divided by structures into separate subpanes. A windowpane 203 may be transparent, translucent, and/or wholly or partially opaque. The windowpane 203, or portions thereof, may be capable of varying in transparency and/or color, depending upon time, automation, lighting, or human control. The layers, sublayers, and/or panes may be fabricated from any material or combination of materials known in the art.

FIG. 3d illustrates a slat gear 320, attached to the left end 703 of slats 200 such as those shown in FIGS. 3a and 3b. Turning the slat gear 320 as indicated by arrow 360 will cause the gear and the attached slat 200 to rotate about axis 361, changing 6, the slat angle 362, relative to the plane of the windowpane 203.

FIGS. 3a and 3b show two possible mechanisms for turning slat gears 320 synchronously, so that all slats 200 maintain the same slat angle 362. In each of these figures, a drive gear 312 is responsible for turning all the slat gears 320. The drive gear 312 may be driven, for example, by a motor 310 or engine, which turns a shaft to which the drive gear 312 is attached.

A slat-angle subsystem 300 might have slat gears 320 only at one end of the slats 200, or it might have a full set of slat gears 320 (i.e., one per slat 200) at both ends. Arrangements are possible with partial sets of slat gears 320 at the left and right ends. Other types of gears and gearing configurations might also be used. The same motor 310, with a single shaft, might be used to rotate gears on both ends of the slats 200 synchronously. Having a full set of slat gears 320 on both ends of the slats 200 may cause the slats 200 to turn more smoothly and reduce binding; this also provides redundancy, so that the slat-angle subsystem 300 can continue to function, possibly with relatively minor repairs, if there is a failure in the gears or other equipment on one side of the blind 207.

The slat-angle subsystem 300 of FIG. 3a transfers torque from one slat gear 320 to the next using a set of intermediate coupling gears 330. The subsystem of FIG. 3b uses a cogged belt 340 for the same purpose. A chain or a screw-drive might also be used to synchronize rotation of slat gears 320. The motor 310 in FIG. 3a happens to be located toward the bottom of the system frame 201, while that in FIG. 3b is located at the top.

FIG. 3c is a schematic diagram illustrating a slat-angle subsystem 300 for controlling the slat angle 362. The subsystem includes a motor 310 and a coupling 311 mechanism such as the coupling gears 330 of FIG. 3a or the belt 340 of FIG. 3b. It also includes controller 390 for controlling the motor 310. The controller 390 may include a processor; tangible digital storage containing data and logic in the form of software instructions; and a communication system that allows it to communicate with the motor 310 and with one or more input devices that the logic uses to determine how to control one or more blinds 207. For example, there might be one or more sensors 437, possibly distributed geographically around a building, that determine sunlight direction. There might be a timing mechanism or scheduler 391, to adjust the angle; the timing mechanism might use the logic and data in storage regarding, for example, daily sunrise, sunset, and position of the sun during the daytime; geometry of the building; geometry and positioning of the windows 204 and blinds 207; and information regarding the heat extraction and/or energy extraction subsystems. There might be a human interface, possibly with a manual control 392. A given slat-angle subsystem 300 might combine two or more of the above motor control mechanisms, establishing priority among them.

The slat angle 362 of a given window 204 might be independent of other windows 204, or there might be centralized control over a plurality of windows 204. For example, a single processing system and database might control blinds 207 in all the individual windows 204 in a large commercial building, taking advantage of all available data to optimize the overall system, possibly adjusting slat angles 362 frequently or even continuously.

Figure 4A:
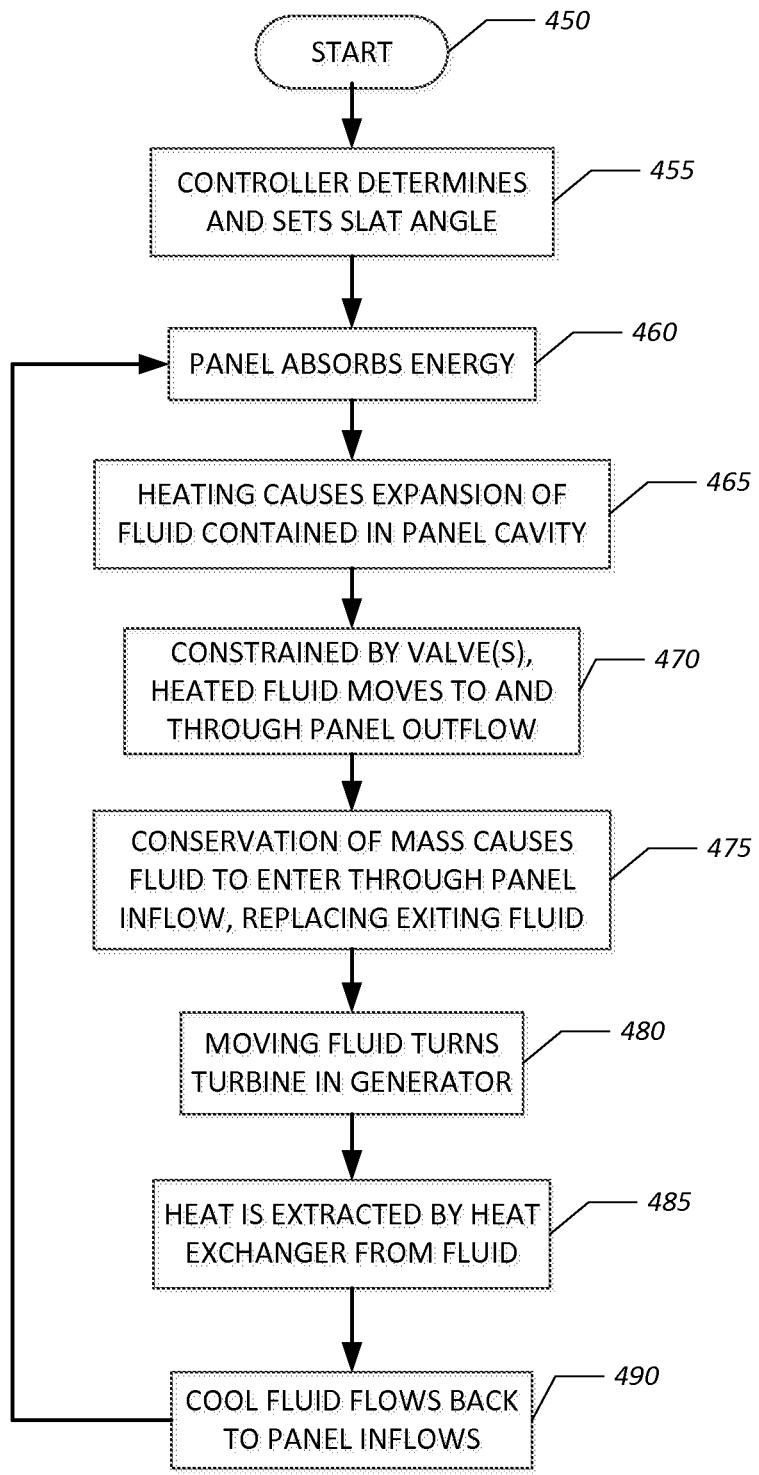
FIG. 4a is a flowchart depicting a process for electricity generation and heat extraction in an HE/EG System.

FIG. 4a is a flowchart depicting a process for electricity generation and heat extraction in an HE/EG system 400. At the start 450, a controller 390 determines and sets 455 the slat angle 362 for a blind 207. The panel 200 absorbs 460 insolation. As will be describe below, the panel 200 contains an internal cavity 560 or chamber, such as a tube, or channels of a Tesla Valve 100, containing a fluid. Heating causes the fluid 440 to expand 465.

Many different types of fluids will work for this purpose, such as an electronic coolant from the FLUORINERT® line from 3M®. These chemicals are described by the manufacturer as "thermally and chemically stable with no chlorine or hydrogen atoms; practically non-toxic through normal routes of industrial exposure; odorless, colorless, and non-flammable, with a viscosity similar to water; and good materials compatibility." FC-72 (perfluorohexane), for example, has a low boiling point (56C).

Constrained by one or more one-way valves, or by a Tesla Valve, the warm fluid 441 moves 470 to and through a panel outflow tube 512 from the panel 200. Conservation of mass creates a pressure gradient that causes cool fluid 442 to enter 475 the cavity 560, replacing warm fluid 441 that has exited. Motion of the fluid 440, forced by heating, turns 480 a turbine in a generator 410. Heat from the warm fluid 441 is extracted 485 by a heat exchanger 420. The cool fluid 442 then flows back 490 to panel inflow tubes 511 in the panels 200. The process repeats. Of course, the step of determining and setting 455 the slat angle 362 may itself be in a loop (not shown).

Figure 4B:
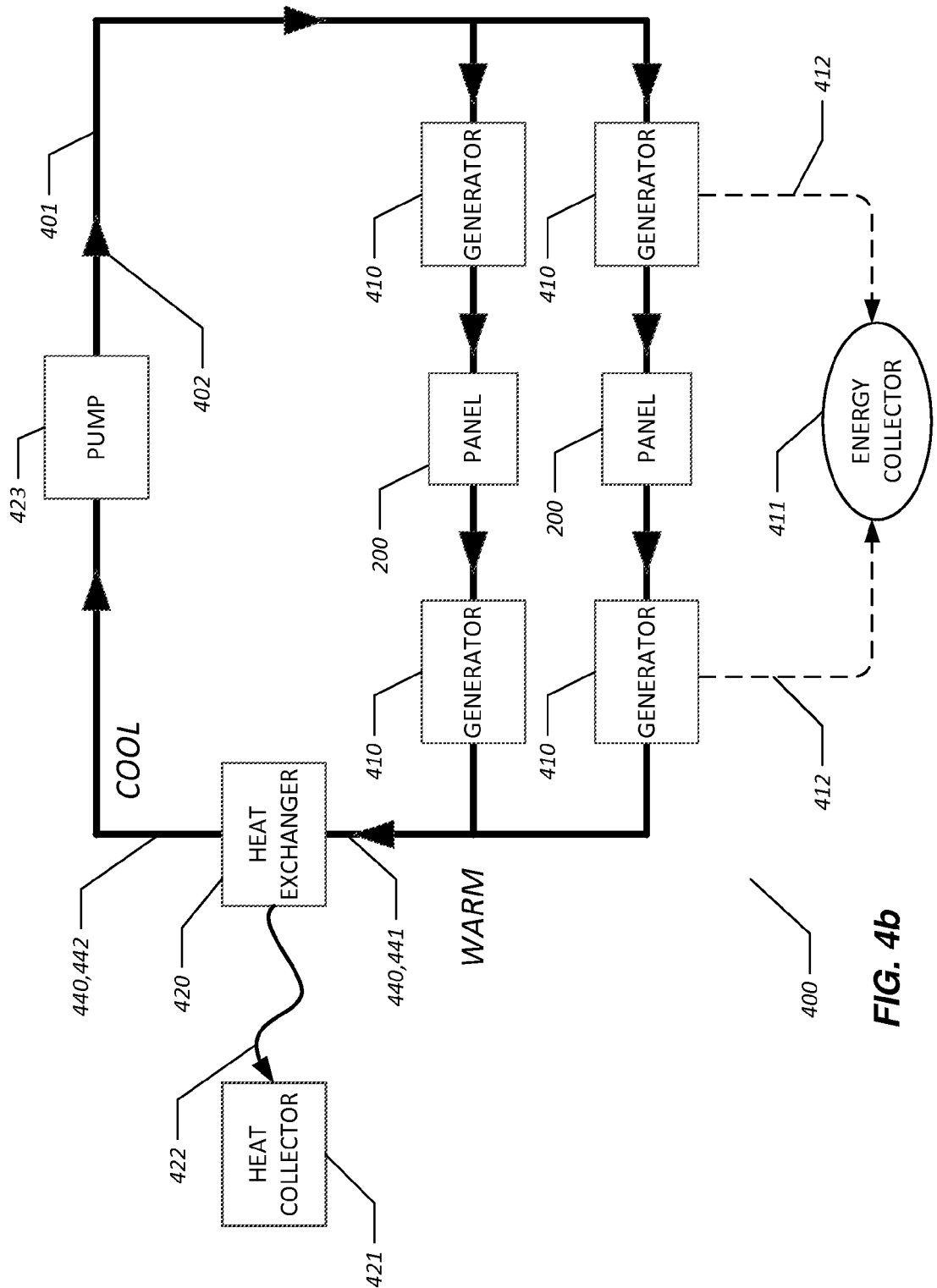
FIG. 4b is a schematic diagram illustrating the interaction of the Fluid Movement Subsystem, the Energy Generation Subsystem, and the Heat Extraction Subsystem in an HE/EG System.

FIG. 4b is a schematic diagram illustrating the interaction among a Fluid Movement Subsystem 430, an Energy Generation Subsystem 431, and a Heat Extraction Subsystem 432, showing the direction of fluid 440 flow through an exemplary HE/EG system 400 that might correspond to the flowchart of FIG. 4a. Heating of fluid 440 in a cavity 560 of the panel 200 exits the panel 200, and generates electricity in a generator 410. This particular system 400 has generators 410 at each end of each panel 200. Other systems 400 might have only one generator 410 per panel 200, or they might have a single generator 410 through which fluid 440 from some or all the panels 200 flows (not shown). Many configurations are possible within the concept and scope of the invention. Generated electricity goes to what we have called an energy collector 411. (For clarity, the drawing only shows connections from two of the generators 410 to the energy collector 411, but other generators 410 such as those in the upper of the two panels 200 shown in the figure, may also connect.)

Examples of energy collectors 411 are the external power grid, the local grid within the building or facility, or an energy storage device. For example, an energy storage device might be a battery of any of the types known in the art, or thermal energy storage. Types of thermal energy storage include, for example, molten salt technology, molten sulfur technology, molten metal technology, water storage in tanks or caverns, electric thermal storage heaters, ice-based technology, cryogenic energy storage. A HE/EG system 400 may use some or all of these types of energy collectors 411, and/or others. Some of the energy produced may be used within the HE/EG system 400 itself; for example, to power a heat exchanger 420 and/or a pump 423.

The warm fluid 441 exiting the generators 410 may flow through a heat exchanger 420, where heat is removed from the system, as indicated by arrow 422, into what we have called a heat collector 421. The heat produced might be used, for example, in a building heating system, one form of heat collector 421. Note that, unless the heat is put back into the rooms of the building, the net effect is to cool the rooms. Thus, a HE/EG system 400 might be used to lower cooling costs in warm climates. The heat produced may also participate, in a heat collector 421 role, by helping to store energy in certain repositories, such as molten salt/sulfur/metal technology.

Exiting the heat exchanger 420 is relatively cool fluid 442, which then flows back to the panels 200. A system 400 may incorporate a pump 423, but during normal operations, a pump 423 may not be necessary since the flow may be wholly or mostly driven by solar heating. Note that some systems may not include all of these components. A person having skill in the art will realize too that different ordering of components are within the inventive concept.

Figure 4C:
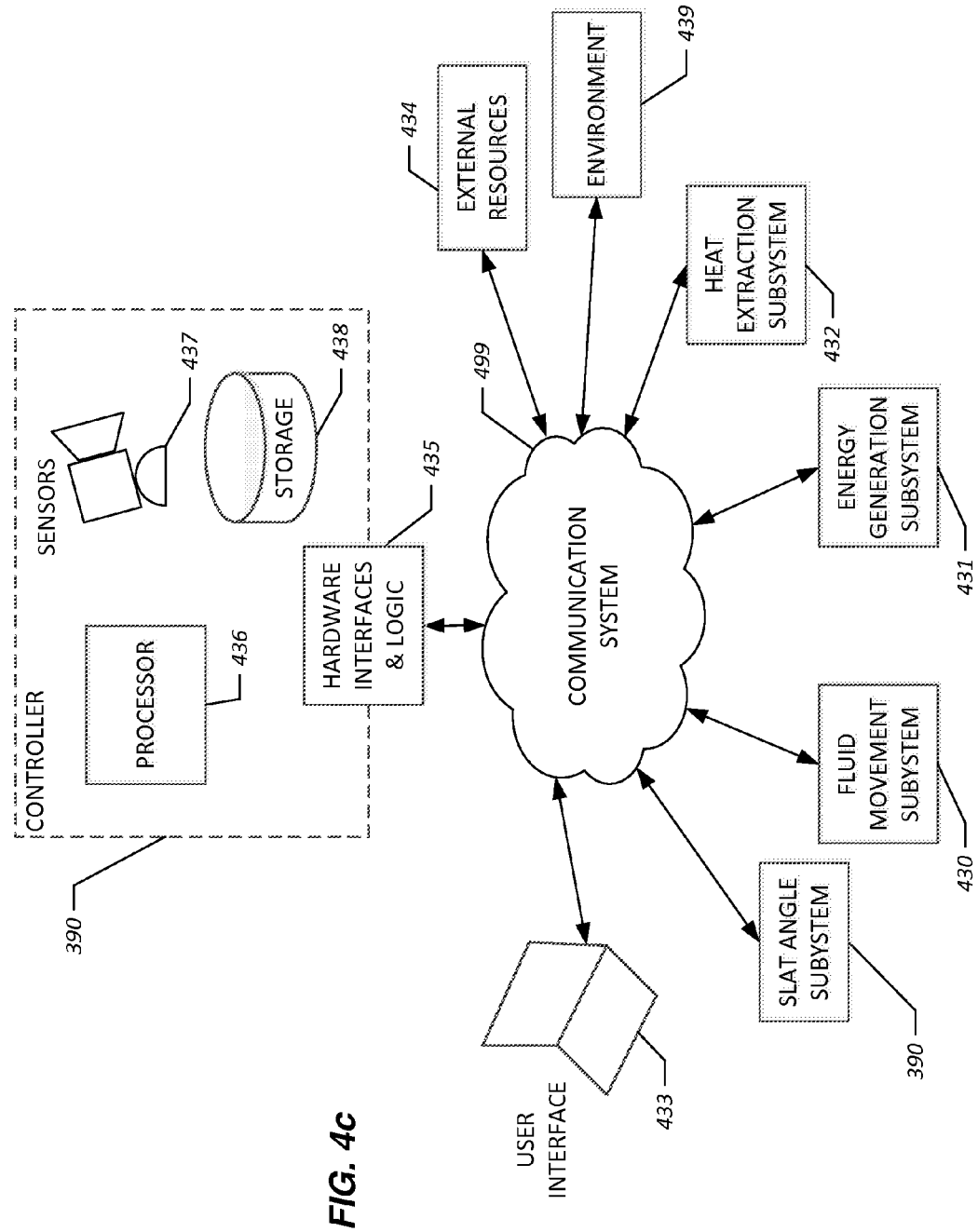
FIG. 4c is a schematic diagram illustrating control of subsystems in an exemplary HE/EG System.

FIG. 4c is a schematic diagram illustrating control of subsystems in an exemplary HE/EG system 400. Exemplary slat-angle subsystems 300 have already been discussed in some detail.

The Fluid Movement Subsystem 430 includes, for example, the fluid 440 itself; the tubing 401 through which the fluid 440 moves, including any tubes, pipes, connectors, joints, valves, and other plumbing or plumbing-like equipment. The Fluid Movement Subsystem 430 also includes the channels 560 through the panels 200; any panel inflow tubes 511 and/or panel outflow tubes 512; the mechanical aspects of the generators 410 (e.g., turbines); a pump 423, if any; and any mechanical aspects of a heat exchanger 420.

The Energy Generation Subsystem 431 includes, for example, the generators 410, the energy collector 411, and any uses of energy within the system 400, such as powering motors 310 for the blinds 207, heat exchanger 420 or pump 423; or within the building or facility.

The Heat Extraction Subsystem 432 includes, for example, the heat exchanger 420, the heat collector 421, and any uses of the resultant heat, or cooling, within the system 400, building, or facility.

The system 400 may have a controller 390 that controls various aspects of the subsystems, such as determining and setting the slat angle 362. The controller 390 may send, receive, or use information about the local environment 439 (e.g., temperature within various rooms in the building); the controller 390 may use information from external resources, such as information from a weather service about an expected winter storm. The controller 390 may utilize sensors 437, that measure parameters in the system 400. The controller 390 may access information and software instructions from tangible digital storage 438, and/or store information there.

The controller 390 communicates with other components using hardware interfaces and logic 435, and a communication system 499. Note that we define a communication system 499 recursively, so any combination of communication systems 499 is itself a communication system 499. This implies that a communication system 499 may be a single system, or any combination of networks, busses, or wired or wireless systems. The controller 390 accesses the communication system 499 through one or more hardware interfaces and logic 435. Other components in the figure may also include hardware interfaces and/or logic for communication. There may be a user interface (UI) 433 for user input and control to the system 400. The UI 433 may be any combination of devices (e.g., computers, tactile controls, or handheld electronic devices) and software.

In the example shown in FIG. 4c, the controller 390 is depicted as separate from the subsystems. However, control functionality may be dispersed over various facilities in any feasible configuration. As a simple example, a sensor of fluid temperature, located within one of the components, e.g. a tube, of the system 400, might be regarded as part of the controller 390. Any physical distribution of functionality is possible within the inventive scope.

Figure 5A:
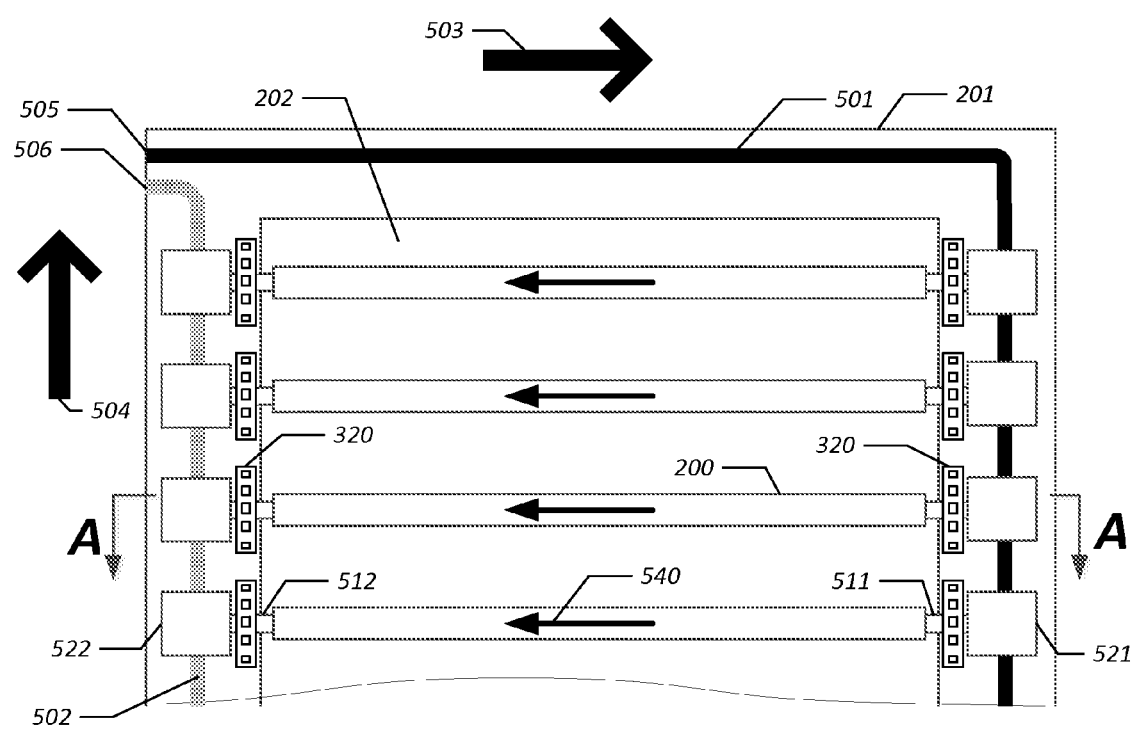
FIG. 5a is a cross section through a system frame, looking at the system frame from inside the building, showing flow to, through, and away from the panels in an exemplary embodiment.

FIG. 5*a* is a cross section through a system frame 201, looking at the system frame 201 from inside the building, showing flow to and through the panels 200 in an exemplary embodiment. The cool fluid 442 from heat exchanger 420 enters the system frame 201 through an inflow port 505 and moves through system inflow tube 501 in the direction indicated by arrow 503. The warm fluid 441 moves through outflow port 506 in the direction indicated by arrow 504, and to the heat exchanger 420. The system inflow tube 501 is connected to a set of inflow hubs 521, one per panel 200 (in this embodiment). In exemplary embodiments represented by FIG. 5*a*, the panel 200 is coupled by connecting components to an inflow hub 521 and an outflow hub 522. A fraction of the input fluid 440 moves through the cavity 560 in, or channel 560 through, each panel 200, driven by heating. Flow through the outflow hub 522 merges with flow from other panels 200 in the system outflow tube 502. Note that, for the reader's convenience, the blind 207 in FIG. 5*a* and some other figures is implemented with flow from right to left, but a person having skill in the art will recognize that a system using the inventive concepts could be configured with flow in any direction.

Figure 5B:
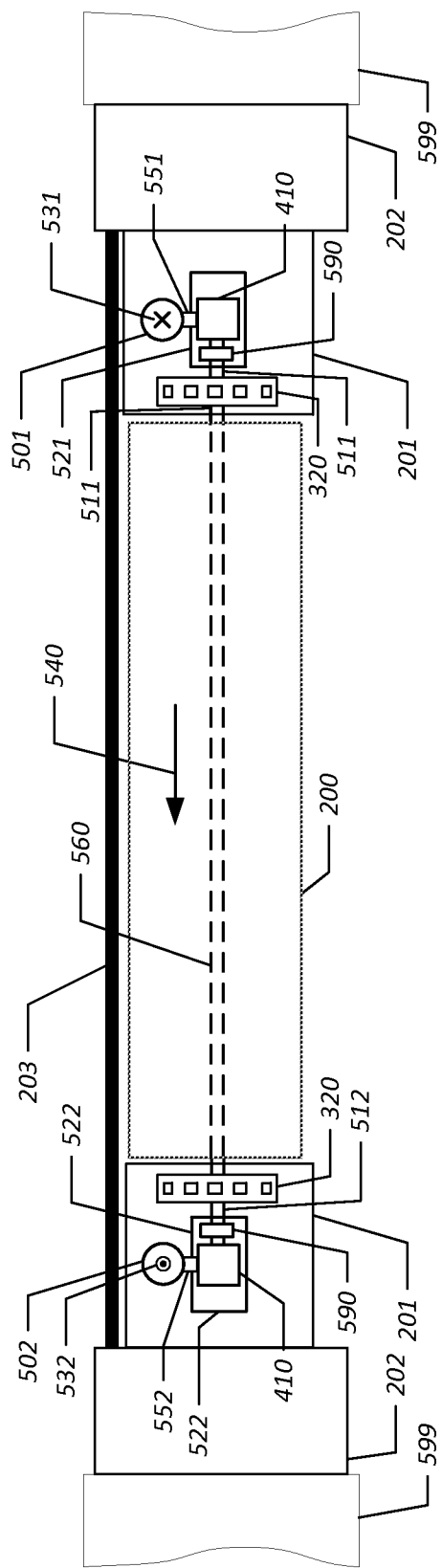
FIG. 5b is an exemplary downward view of a panel and hubs, corresponding generally to cross-section A-A in the previous figure.

FIG. 5*b* is a downward view of a panel 200 and hubs, corresponding to cross section A-A in FIG. 5*a*. A legacy frame 202 and legacy windowpane 203 are installed in a wall 599. A system frame 201 of a HE/EG system 400 has been retrofit. Flow into an inflow hub 521 through the system inflow tube 501 is indicated by a 'X' 531. The inflow hub 521 and an outflow hub 522 are shown here conceptually, and indeed, the hubs themselves may not be contained in physical boxes as show; the types, layouts, and configurations of components may be done in any number of ways within the conceptual scope. An inflow hub 521 is connected to a generator 410 by a tube 551. In this embodiment, outflow from the generator 410 goes through a one-way valve 590 that only allows flow to move into the panel 200. Flow moves though the cavity 560 or channel 560 in the panel 200 in the direction indicated by arrow 540. Fluid exiting the panel 200 enters an outflow hub 522. The outflow hub 522 contains a one-way valve 590, preventing the fluid from reentering the panel 200. It then flows through a second generator 410, and merges with the system outflow in system outflow tube 502, moving in the direction indicated by arrow 504.

Figure 6A:
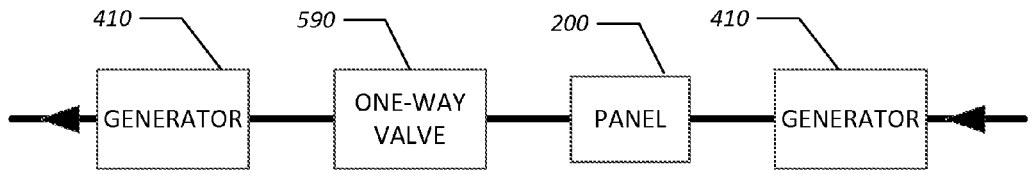
FIG. 6a is a schematic diagram, illustrating a first possible configuration, based upon one-way valves, of functional components of a window blind.
Figure 6B:
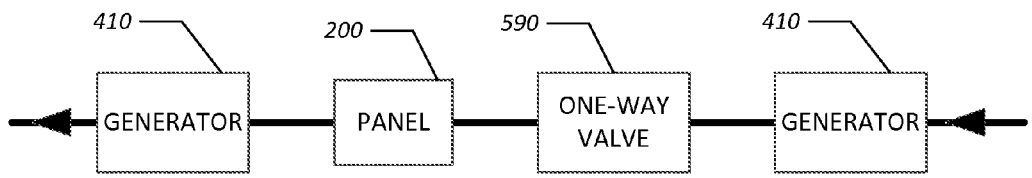
FIG. 6b is a schematic diagram, illustrating a second possible configuration, based upon one-way valves, of functional components of a window blind.
Figure 6C:
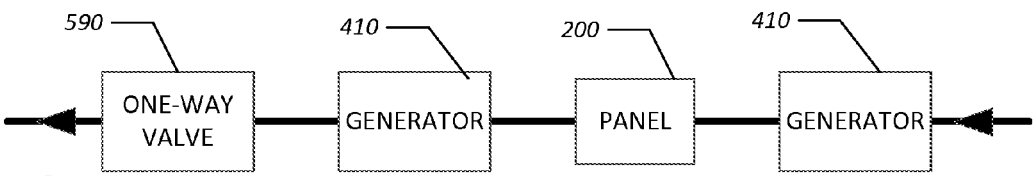
FIG. 6c is a schematic diagram, illustrating a third possible configuration, based upon one-way valves, of functional components of a window blind.
Figure 6D:
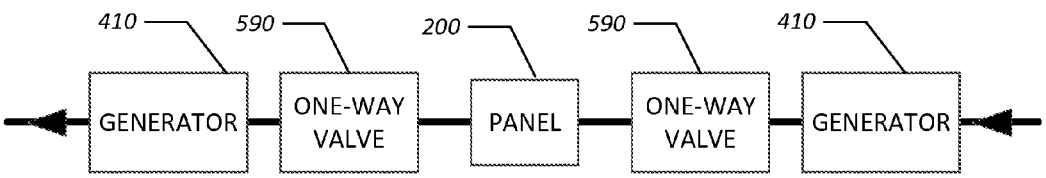
FIG. 6d is a schematic diagram, illustrating a fourth possible configuration, based upon one-way valves, of functional components of a window blind.
Figure 6E:
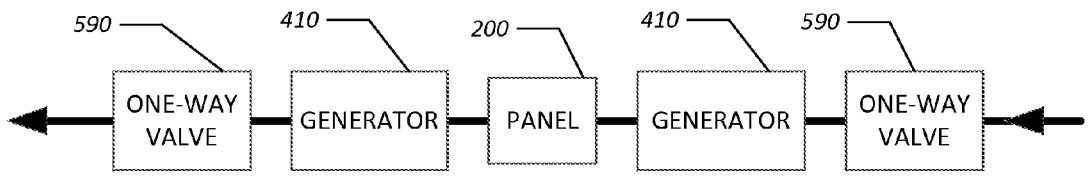
FIG. 6e is a schematic diagram, illustrating a fifth possible configuration, based upon one-way valves, of functional components of a window blind.
Figure 6F:
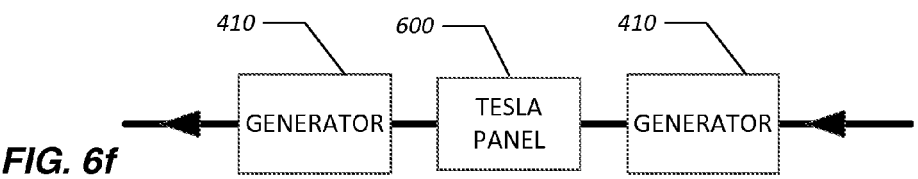
FIG. 6f is a schematic diagram, illustrating a possible configuration of functional components of a window blind, through which a Tesla Valve achieves one-way flow.

FIG. 6*c* shows some of the orderings of generators 410 and one-way valves 590, relative to a panel 200 which might be used. All the components in these figures have already been identified and explained. FIG. 6*f* is somewhat different, incorporating Tesla Valve 100 channels and baffles into the cavity 560 of a panel 200. In the FIG. 6*b* configuration, separate one-way valves 590 are unnecessary.

Figure 7A:
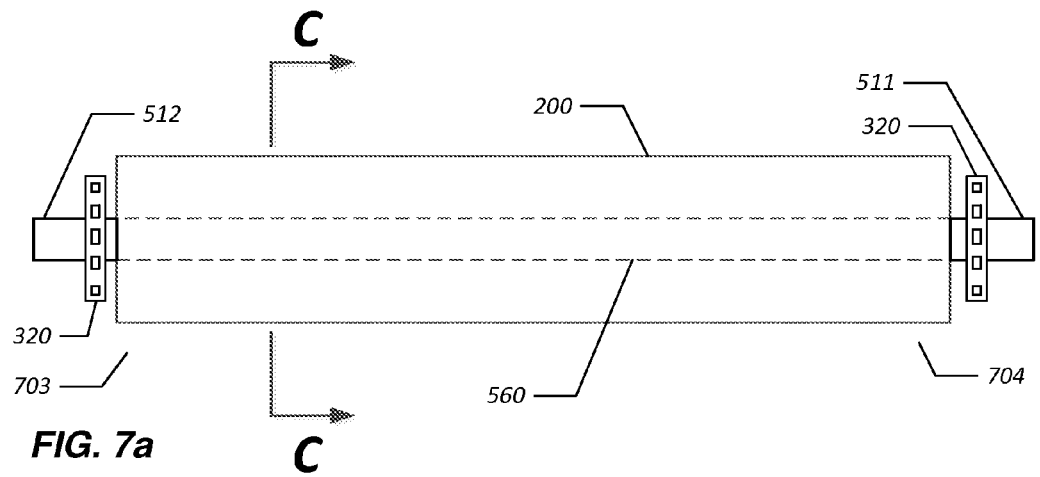
FIG. 7a is a top view, illustrating a panel that includes a tube or channel for fluid flow through the panel.
Figure 7B:
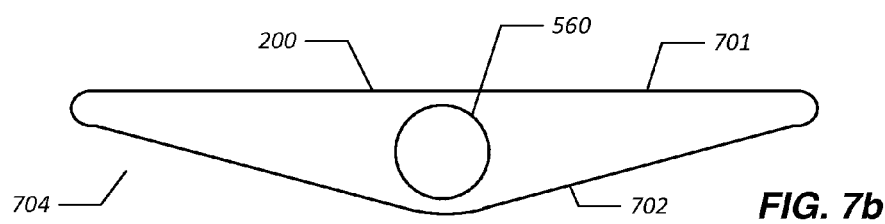
FIG. 7b is a possible cross section, at C-C of the panel of the previous figure.

FIG. 7*a* is a top view, illustrating a panel 200 that includes a tube or channel 560 for fluid flow from an panel inflow tube 511 at the right end 704 to an panel outflow tube 512 at the left end 703. FIG. 7*b* shows an exemplary cross section, corresponding generally to C-C of FIG. 7*a*.

In FIG. 7*b*, the upward side has been labeled as the exterior-facing side 701 of the panel 200, and the downward side has been labeled as the interior-facing side 702. The next panel 200 in sequence within a blind 207 might be flipped. Thus, the tapering profile of this panel 200 allows successive panels 200 to overlap as in a venetian blind, while still having a low profile relative to the surface of the windowpane 203. The panel 200 in FIG. 8*b* has a different tapering profile that could also allow successive panels 200 to overlap.

Consider the panel 200 of FIG. 7*a* and FIG. 7*b*, except for the attached slat gears 320, but including the panel inflow tube 511 and panel outflow tube 512. The region between the outer surface and the channel 560 might be solid, empty, or filled with a fluid (e.g., water). The channel 560 might initially be a separate component, such as a length of pipe or tubing, that is then integrated with an outer shell. An outer shell might be formed from one or more pieces, such as top and bottom halves. A panel 200 might be made, for example, from metal, alloy, plastic, polymer, fiberglass, glass, or from some other material; or from some combination, mixture, or compound thereof. A panel 200 might be assembled, molded, extruded, machined, or etched (e.g., by some laser process)—from one component or from a plurality of components.

For example, a panel 200 might be made as a single piece of metal (e.g., aluminum) in two steps: (1) extrusion of the basic cross section (e.g., as in FIG. 7*b*) over the total length of the panel 200, including the lengths of the panel inflow tube 511 and panel outflow tube 512; and (2) machining of right end 704 and left end 703 down to the panel inflow tube 511 and panel outflow tube 512. A 3D printer might be also be used to produce a panel 200, including the panel inflow tube 511 and panel outflow tube 512, from an initially molten material, as a single piece.

Figure 8A:
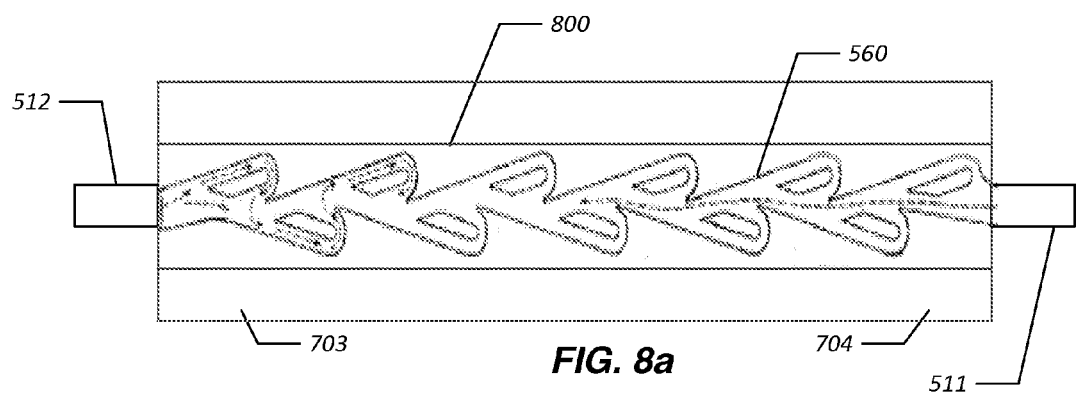
FIG. 8a is a top view illustrating a panel including a Tesla Valve.
Figure 8B:
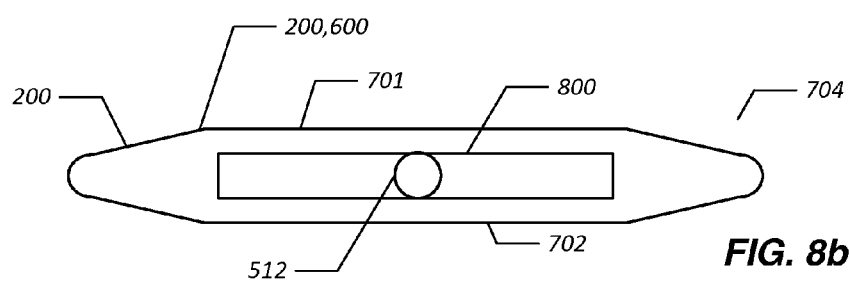
FIG. 8b is a possible cross section of the panel of the previous figure.

FIG. 8*a* is a cutaway view of a panel 200, in which the channel 560 is configured as a Tesla Valve 100. This type of cavity 560 might be produced, for example, by machining, etching, molding, or 3D printing. The latter two techniques could be used to fabricate an entire panel 200 in one piece, including, if so desired, the panel inflow tube 511 and panel outflow tube 512. In the exemplary case shown, the cavity 560 is within a generally rectangular component (possibly molded or printed) that is inserted into a panel 200 shell, hollowed to fit. The panel inflow tube 511 and panel outflow tube 512 may be part of the insert, or separately attached.

The panel inflow tube 511 and the panel outflow tube 512 may rotate with the panel 200 itself, but ultimately some rotating component, such as a pipe or tube, will connect to another pipe, tube, or some other component (e.g., a one-way valve 590 or a generator 410) that does not rotate. A number of methods are known to practitioners in the art to accomplish this, that might be used in a HE/EG system 400; for example, a rotary union (also known as a rotary swivel, a rotary coupling, or a rotary joint) can be used to couple a rotating pipe to a non-rotating pipe.

Of course, many variations of the above method are possible within the scope of the invention. The present invention is, therefore, not limited to all the above details, as modifications and variations may be made without departing from the intent or scope of the invention. Consequently, the invention should be limited only by the following claims and equivalent constructions.

What is claimed is:

1. An apparatus, comprising:
   a) a plurality of panels, each panel in the plurality including, or coupled to, a panel inflow port and a panel outflow port, and describing an internal cavity connecting the panel inflow port to the panel outflow port;
   b) a frame, into the panels are rotationally mounted in parallel to each other;
   c) fluid, in the cavity of each panel in the plurality of panels, that expands when sufficiently heated;
   d) a system inflow port and a system outflow port, each connected to a heat exchanger;

e) for each panel in the plurality, a respective panel first generator that generates electricity from fluid motion through that panel, and f) a tubing system that is connected to the system inflow and outflow ports, and to the inflow and outflow ports of each panel.

2. The apparatus of claim 1, further comprising:

g) a first one-way valve to which the tubing system is connected.

3. The apparatus of claim 1, wherein the configuration of the cavity in one of the panels forms a Tesla Valve, which inhibits the fluid from moving from the outflow port to the inflow port through that cavity.

4. The apparatus of claim 1, further comprising:

g) a windowpane, through which sunlight passes and strikes the panels.

5. The apparatus of claim 4, wherein the sunlight strikes the panels, without any intervening mirrors or lenses on either side of the windowpane.

6. The apparatus of claim 1, further comprising:

g) for each panel in the plurality, a respective panel second generator that generates electricity from fluid motion through that panel.

7. The apparatus of claim 6, wherein each panel in the plurality of panels is coupled to a respective one-way valve proximate to the panel inflow port or to the panel outflow port.

8. The apparatus of claim 6, wherein the panel first generator is located proximate to the panel inflow port of the respective panel, and the panel second generator is located proximate to the outflow port of the respective panel.

9. The apparatus of claim 8, wherein a respective panel first one-way valve is located proximate to the inflow port and a respective panel second one-way valve is located proximate to the outflow port.

10. The apparatus of claim 8, wherein each panel in the plurality of panels is coupled to a respective one-way valve proximate to the panel inflow port or to the panel outflow port.

11. The apparatus of claim 1, wherein the panel first generator is located in, or proximate to, the inflow port or the outflow port of the respective panel.

12. The apparatus of claim 1, wherein each panel in the plurality of panels is coupled to a respective one-way valve proximate to the inflow port or to outflow port of that panel.

13. The apparatus of claim 1, further comprising:

g) a first set of gears, a respective one of the gears coupled to each panel in the plurality of panels;

h) a motor, having a shaft; and i) a coupling mechanism, whereby rotation of the shaft causes each panel in the plurality of panels to rotate synchronously.

14. The apparatus of claim 13, further comprising:

g) a second set of gears, at least one gear in the second set meshing with two gears of the first set of gears.

15. The apparatus of claim 13, further comprising:

g) a belt, a chain, or a screw drive, which meshes with two gears of the first set of gears.

16. The apparatus of claim 1, wherein a panel is fabricated by extruding metal to form a cavity and a surface to be exposed to the sun, and then machining the result to form a panel input port or a panel output port.

17. The apparatus of claim 1, wherein the internal cavity described by the respective panel follows a circuitous path between the panel inflow port and the panel outflow port.

18. The apparatus of claim 1, wherein the configuration of the cavity in one of the panels inhibits the fluid from moving from the outflow port to the inflow port through that cavity and allows the fluid to move from the inflow port to the outflow port.

19. A system, comprising:

a) a slat angle subsystem that sets an angle, relative to the plane of a windowpane, of a plurality of solar panels in a set of solar panels;

b) a fluid movement subsystem, including a plurality of one-way valves, which transports fluid from the plurality of solar panels, the fluid flowing at least in part by thermal expansion due to solar heating, through a tubing system to components of the system, said components including the solar panels in the plurality;

c) an energy generation subsystem, including a plurality of generators that generate energy from the fluid motion, the plurality of generators including a first generator that generates energy only from fluid flow through a first solar panel in the plurality of solar panels, and a second generator that generates energy only from fluid flow through a second solar panel in the plurality of solar panels;

d) a heat extraction subsystem, including a heat exchanger that removes heat from the fluid.

20. The system of claim 19, further comprising:

e) a controller, that determines the angle.

21. A process, comprising:

a) setting a common slant angle for a set of parallel panels in a window blind;

b) heating the panels by absorption of incoming solar radiation;

c) expanding fluid in respective cavities of each of a plurality of the panels due to the heat, thereby causing fluid flow in parallel through the respective cavities;

d) generating electricity from the respective fluid flow through each of the cavities in the plurality of panels using a respective turbine in each cavity; and e) removing heat from the fluid in a heat exchanger.

22. The process of claim 21, further comprising:

f) retrofitting the window blind, which includes a frame, inside of an existing window frame and adjacent to an existing windowpane.

23. The process of claim 21, further comprising:

f) determining by a controller that energy generation would be improved by changing the common slant angle; and g) changing the common slant angle based on the determining step.

24. The process of claim 21, further comprising:

f) using heat removed from the fluid to warm a portion of a building in which the window blind is installed.

\* \* \* \* \*